UNITED STATES PATENT OFFICE.

JOHN W. HYATT, OF NEWARK, NEW JERSEY, ASSIGNOR TO THE HYATT PURE WATER COMPANY, OF SAME PLACE.

FILTERING SUBSTANCE.

SPECIFICATION forming part of Letters Patent No. 369,717, dated September 13, 1887.

Application filed December 18, 1886. Serial No. 222,006. (No specimens.)

*To all whom it may concern:*

Be it known that I, JOHN W. HYATT, a citizen of the United States, residing at Newark, Essex county, New Jersey, have invented certain new and useful Improvements in Filtering Substances, fully described in the following specification.

The object of this invention is chiefly to produce a very fine filtering material or substance which can be readily molded into any form, and which is capable of separating from water the finest impurities.

The invention consists in a mixture of emery, quartz, or analogous mineral substance in granular form with a cement adapted to bind such particles together and to form them into a solid substance, the composition being subjected during the hardening operation to air-pressure for the purpose of expelling from the pores of the substance the surplus of the cement, and thus producing the porous constitution desired. The cement or binding agent mixed with the granules should be of a waterproof character—as shellac or paraffine—if the substance is intended for filtering water, but may consist in liquid glue or equivalent agent if the composition is to be used for other purposes. The cement may be rendered fluid in the practice of my invention either by solution, as in the case of shellac, or by the application of heat, as when paraffine is used, and the fluidity maintained during the operation of the air-pressure upon the substance to render it porous.

To produce the fine filtering substance or porous composition which is the object of my invention, I use, preferably, the flour of emery and mix the cement therewith to a consistency adapted to mold the same into a porous tube, diaphragm, or article of any other form desired for a filtering medium, the article being sustained upon a fine screen adapted to its contour to permit the escape of the fluid from its lower side, and is then subjected to atmospheric pressure, which operates upon the fluid cement and forces it gradually from its pores or interstices, replacing it by the air, which, by its presence therein or its continued passage through the interstices, serves to keep them open until the cement has fully hardened by the drying of the solvent or the removal of the heat from a melted cement, as paraffine.

The air may be forced through the interstices by subjecting one side of the article to artificial air-pressure of any desired intensity, or to a vacuum which would induce an atmospheric pressure of nearly fifteen pounds upon each square inch of the surface.

An alkaline silicate may be used as the cement if the substance be treated by the Ransom process after it has been rendered pervious by the air-current.

It is obvious that other substances, also, which do not require heat or solution to soften them might be used as the cement. Thus boiled linseed-oil would retain its fluidity until the surplus had been removed by air-pressure, and that portion remaining between the granules would then gradually harden by exposure to the air, as in the case of putty, and form the grains into a solid substance.

The surplus of the cement removed by the air-current is that part of the cement which fills the interstices between the granules, but is not operative to join or attach their adjacent surfaces, and its removal therefore empties the interstices between the separate granules and operates in the desired manner to produce a structure through which water may permeate.

I have found that flour emery cemented with a solution of shellac and subjected to atmospheric pressure is formed into a porous substance of so fine and even a texture that all the impurities perceptible in foul water are arrested upon its surface, and that when the surface is cleansed the filtering qualities of the substance are rendered as perfect as when new.

I do not limit myself in the use of this process to granules of any particular substance or dimensions.

Having thus set forth my invention, what I claim herein is—

The process herein described of forming a porous composition, consisting in mixing granules with a suitable cement, molding the said mixture into the desired form, discharging the surplus of the cement from the interstices of the substance by air-pressure, and then permitting the granules and cement to harden into a solid substance, substantially as herein set forth.

In testimony whereof I have hereunto set my hand in the presence of two subscribing witnesses.

JOHN W. HYATT.

Witnesses:
 THOS. S. CRANE,
 W. R. SANDS.